United States Patent
Workman

[11] Patent Number: 5,868,214
[45] Date of Patent: Feb. 9, 1999

[54] CRUISE CONTROL GOVERNOR USING OPTIMAL DROOP SELECTION LOGIC

[75] Inventor: Matthew W. Workman, Indianapolis, Ind.

[73] Assignee: Cummins Engine Company, Inc., Columbus, Ind.

[21] Appl. No.: 520,714

[22] Filed: Aug. 29, 1995

[51] Int. Cl.⁶ .................................................. B60K 31/04
[52] U.S. Cl. .................. 180/179; 123/357; 364/426.042
[58] Field of Search ...................... 364/426.041, 426.042; 180/170, 178, 179; 123/357

[56] References Cited

U.S. PATENT DOCUMENTS

5,021,958  6/1991  Tokoro .................................... 180/170
5,420,793  5/1995  Oo et al. .................................. 180/179
5,445,128  8/1995  Letang et al. .

*Primary Examiner*—Brian L. Johnson
*Assistant Examiner*—Avraham Lerner
*Attorney, Agent, or Firm*—Woodard, Emhardt, Naughton Moriarty & McNett

[57] ABSTRACT

A cruise control governor which is able to dynamically define and switch between various goal droop curves in order to find the best goal droop curve for use with the current vehicle driving situation. For instance, the present invention will dynamically define and select different goal droop curves when the vehicle is lugging up a hill, coasting down a hill, cruising on level ground, preparing to crest a hill, or preparing to transition off of a downhill slope.

9 Claims, 8 Drawing Sheets

CRUISE CONTROL GOVERNOR USING OPTIMAL DROOP SELECTION LOGIC

TECHNICAL FIELD OF THE INVENTION

The present invention generally relates to cruise control governors and, more particularly to a cruise control governors using optimal droop selection logic.

BACKGROUND OF THE INVENTION

Figure 1A:
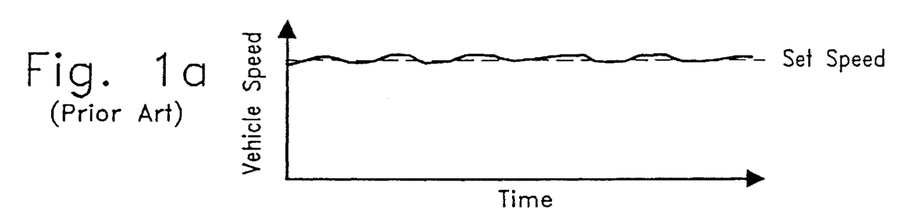
FIG. 1(a) is a plot of vehicle speed as maintained by a cruise control governor plotted as a function of time.
Figure 1B:
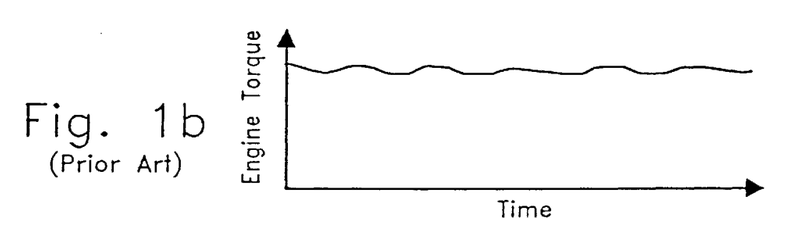
FIG. 1(b) is a plot of engine torque produced by the cruise control governor of FIG. 1(a) plotted as a function of time.

As is known in the art, a cruise control governor attempts to maintain a user-selected vehicle speed. Referring to FIG. 1(a), if the vehicle speed maintained by the cruise control governor is plotted as a function of time, it is apparent that the actual vehicle speed is not perfectly maintained at the cruise control set speed, because the controller can only attempt to maintain the desired set speed by measuring deviation of the actual speed from the set speed. The governor attempts to maintain a constant vehicle speed by controlling the amount of fuel which is provided to the engine, which is roughly proportional to the amount of torque that the engine will generate. FIG. 1(b) plots the engine torque vs. time which corresponds to the vehicle speed plot of FIG. 1(a). If the vehicle speed is plotted against engine torque, as in FIG. 2, a convenient paradigm is provided for visualizing the action of the cruise control governor. Viewing the cruise control governor from the perspective of FIG. 2 indicates that the engine will produce whatever engine torque is required to maintain a constant vehicle speed. Since the torque that goes into the vehicle varies with the terrain, the torque generation from the engine must also vary in order to maintain a constant vehicle speed.

Figure 3:
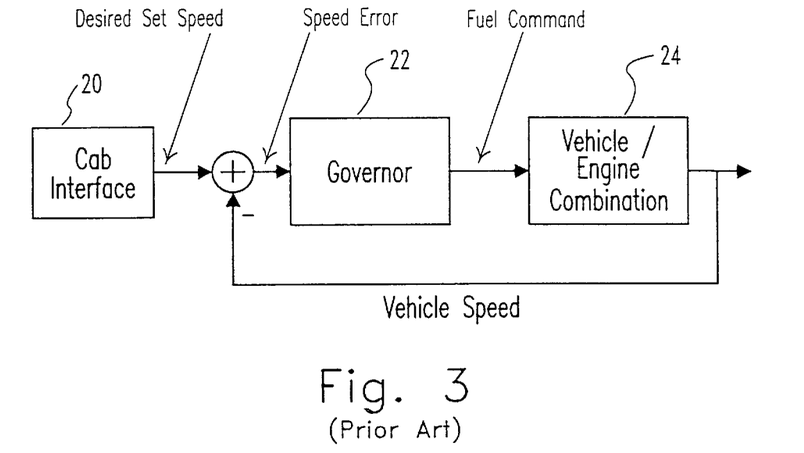
FIG. 3 is a schematic block diagram of a prior art cruise control governor.
Figure 4A:
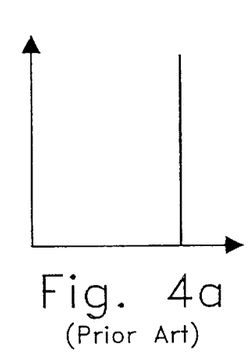
FIG. 4(a)–(f) are examples of prior art cruise control governor droop curves.
Figure 4B:
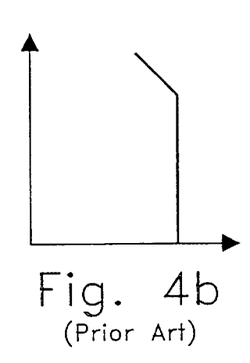
Figure 4C:
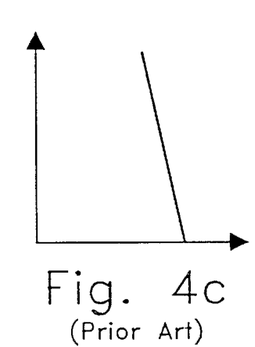
Figure 4D:
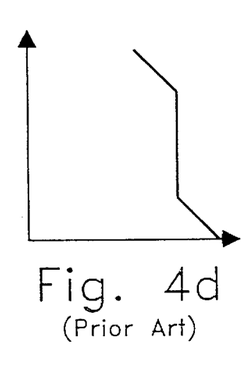
Figure 4E:
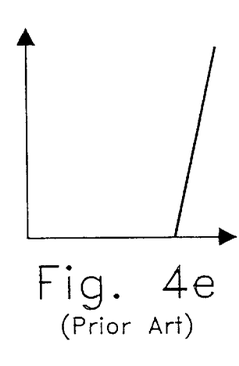
Figure 4F:
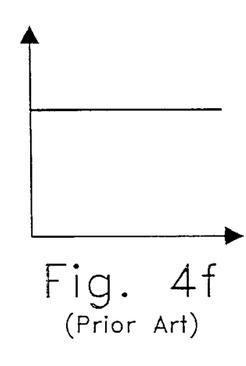

Cruise control governors are devices that attempt to maintain a desired set speed condition by monitoring the system that they are trying to control. The cruise control governor monitors the road speed of the vehicle and reacts by changing the fuel command to the engine. For example, when the governor detects an underspeed condition, the governor increases the torque generation of the engine in order to increase the speed of the vehicle, thereby compensating for the undesirable underspeed situation. Thus, the governor is not capable of reacting until it recognizes that the vehicle has already deviated from the set speed. Once the vehicle has deviated from the set speed, it is too late for the governor to provide a perfect response, therefore the governor attempts to return the vehicle to the set speed as quickly as possible. Because the vehicle must deviate from the set speed before the governor reacts, it is impossible for the governor to provide a perfect response. This is why the plot of vehicle speed vs. time in FIG. 1(a) exhibits slight deviations both above and below the vehicle set speed. FIG. 3 is a process flow diagram which illustrates the interaction of the governor 22 with the vehicle/engine combination 24. The actual measured vehicle speed is subtracted from the desired set speed (which is set by the driver using the cab interface 20) in order to create a speed error signal. This speed error signal is input to the governor 22, which adjusts the fuel command signal to the vehicle/engine combination 24 in response thereto.

Figure 2:
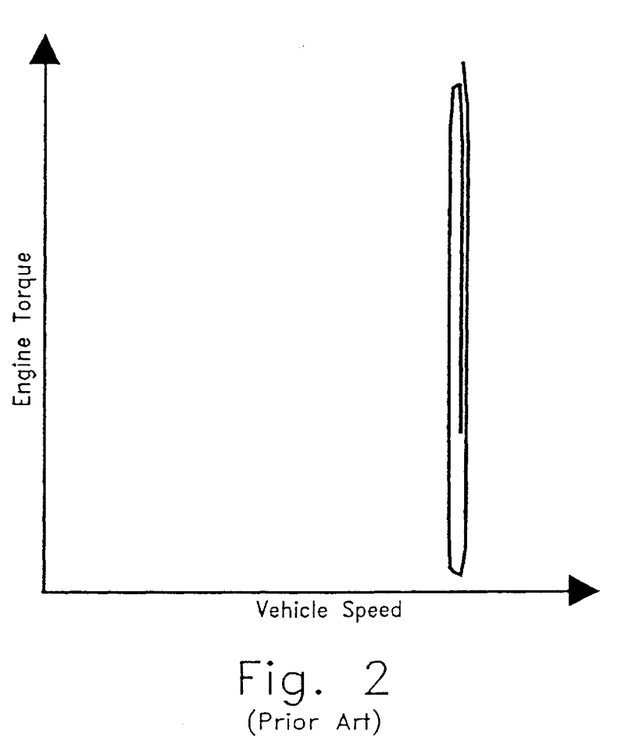
FIG. 2 is a plot of engine torque vs. vehicle speed for the data represented by FIGS. 1(a)–(b).

The plot of engine torque vs. vehicle speed in FIG. 2 is referred to as a "droop" curve. Such a droop curve is realized because the controller is attempting to follow a goal droop curve. The controller adjusts its response, and thus the response of the engine, as a function of the current operating conditions of the vehicle and as a function of the goal droop curve. FIGS. 4a–f illustrate examples of various goal droop curves. The shape of the goal droop curve used with any particular controller depends upon the particular response that is desired from the controller.

The ability for the controller to follow the goal droop curves depends upon the gain of the governor. The governor's gain is an indication of the aggressiveness of the controller. A high gain provides a very aggressive governor that will adjust engine torque generation rapidly in an attempt to follow the goal droop curve. However, aggressive gain governors also have a tendency to be unstable. In summary, the goal droop curves define where the controller attempts to maintain vehicle operation, and the governor gains define how aggressively the goal droop curves are followed.

Figure 5:
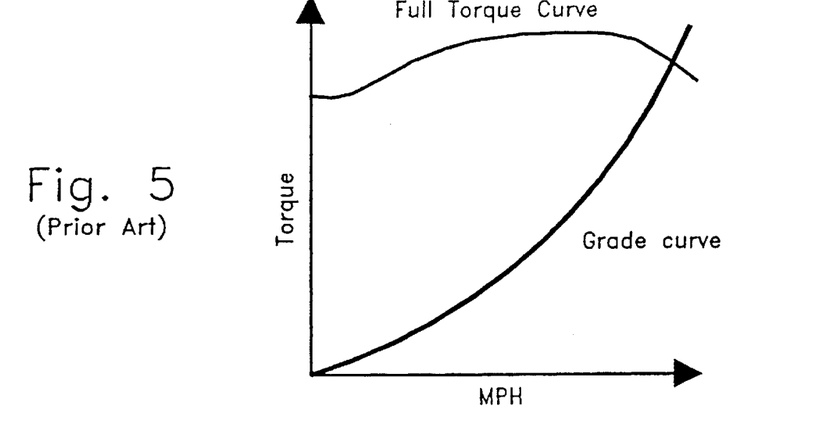
FIG. 5 is a plot of a prior art grade curve.
Figure 6:
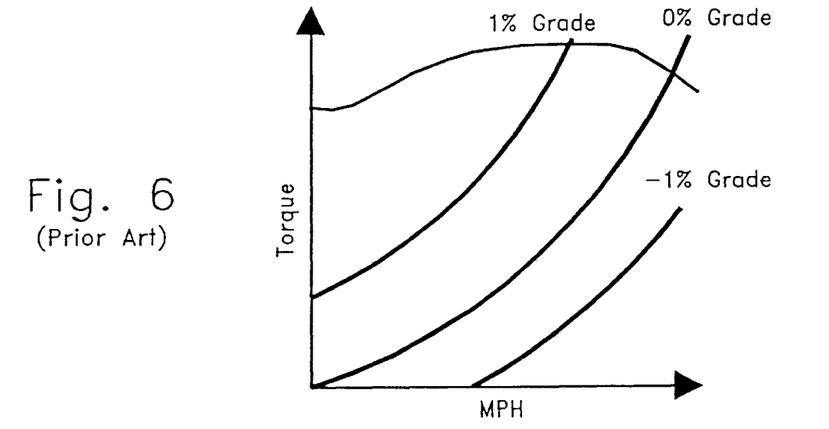
FIG. 6 is a plot of several prior art grade curves exhibiting different percent grades.
Figure 7:
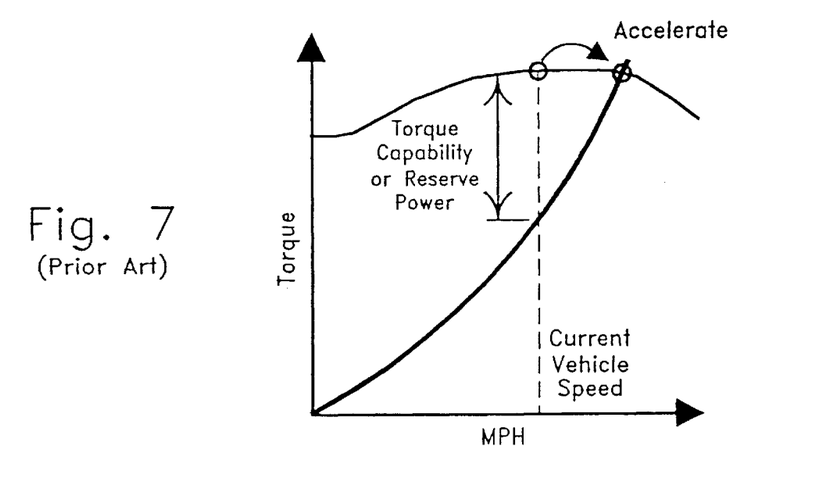
FIG. 7 is a plot of a prior art grade curve.

Because vehicle speed determines where on the goal droop curve the controller attempts to operate, environmental factors which affect the speed of the vehicle affect the performance of the controller. One such environmental factor is the grade of the road surface upon which the vehicle travels. Gradability is a concept that allows one to consider the relationship between vehicle speed, the grade of a hill, the full torque curve of the engine, aerodynamic drag, gearing and torque requirements. This concept utilizes a grade curve as illustrated in FIG. 5. The grade curve denotes the torque needed, at every speed, to remain at an equilibrium for a certain combination of hill grade, aerodynamic drag, and gearing selection. FIG. 6 shows some examples of how various hill grades affect the placement of the grade curve. Such grade curves are useful because they provide an easy means to determine if the vehicle is going to accelerate or decelerate. If, at the current vehicle speed, the grade curve is higher than the torque curve, then the vehicle will slow down to the point of intersection between the grade curve and the torque curve. If, at the current vehicle speed, the grade curve is lower than the torque curve, then the vehicle will accelerate to a vehicle speed where the grade curve and the torque curve intersect. FIG. 7 shows an example of such movement.

Figure 8:
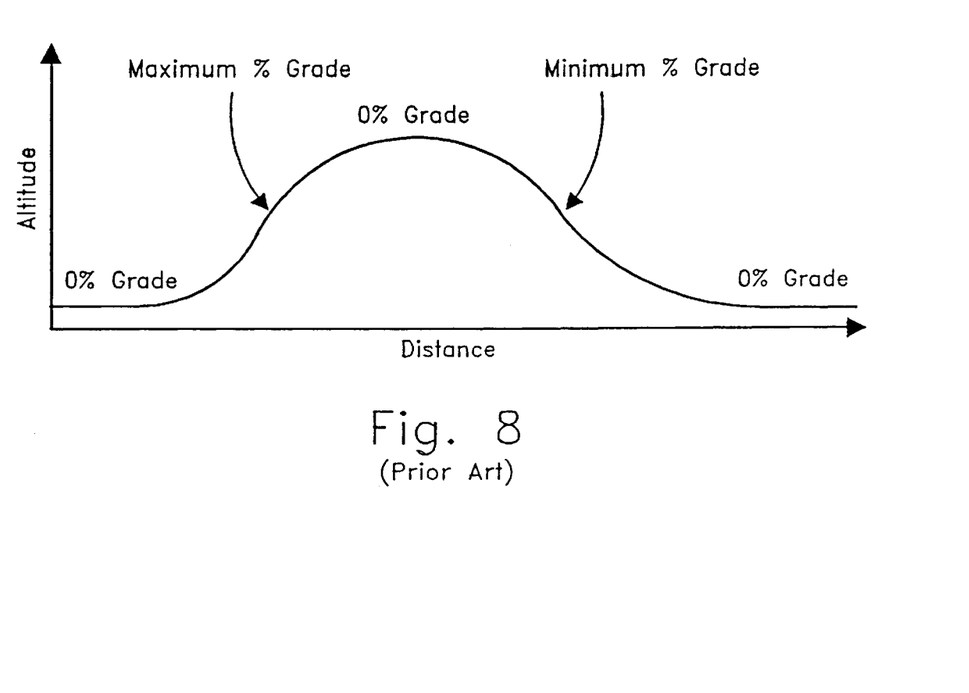
FIG. 8 is a plot of altitude vs. distance for a symmetrical hill.
Figure 9:
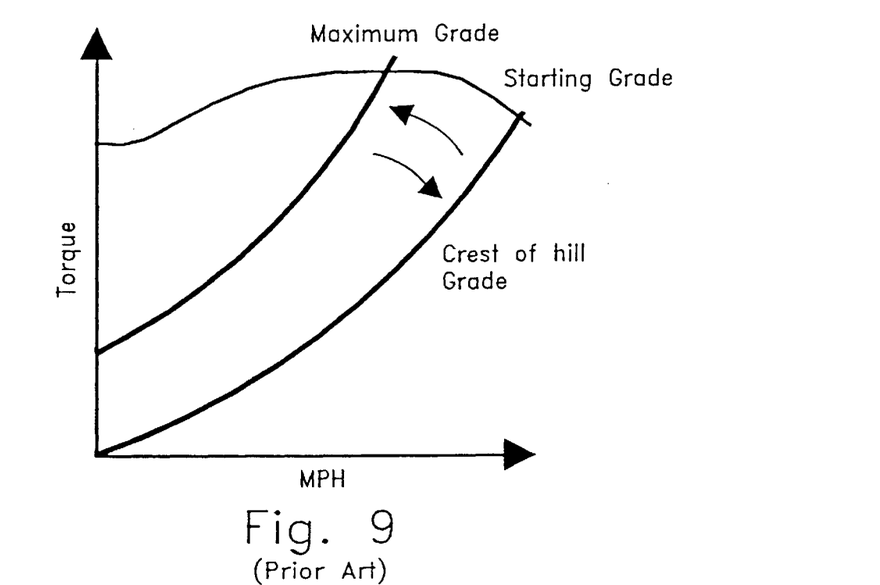
FIG. 9 illustrates the movement of a grade curve as a vehicle crests a hill.

When the vehicle goes over a hill, the grade varies depending upon where on the hill the vehicle is placed. FIG. 8 shows the various grades which are encountered by the vehicle on a symmetrical hill. As illustrated in FIG. 9, the grade curve for a vehicle progressing to the top of a hill will move to the left as the maximum percent grade is reached, and then move back to the right as the grade is decreased back to zero. If the vehicle slows down at all before the crest of the hill, due to the higher torque requirements, then the vehicle will accelerate before the top of the hill because the grade curve moves to the right as the vehicle approaches the crest of the hill (0% grade). The exact location of the start of the acceleration will depend upon the shape and length of the hill, the rating of the engine, and the aerodynamics of the vehicle.

Because most hills are relatively symmetrical and follow the model of FIG. 8, acceleration of the vehicle as it nears the crest of the hill is undesirable due to the fact that the vehicle will accelerate automatically on the downside of the hill due to the negative grade. Conversely, a vehicle entering a valley will decelerate on the downside of the hill prior to its eventual automatic deceleration when it encounters the upside of the hill on the opposite side of the valley. When a vehicle accelerates prior to a point where the terrain will cause the vehicle to accelerate automatically, or when a vehicle decelerates prior to a point where the terrain will cause the vehicle to decelerate automatically, fuel is wasted.

In the interest of increasing fuel economy of the vehicle, it is therefore desirable to design a controller which is able to recognize that the vehicle is cresting a hill or approaching the bottom of a valley and thereby alter the performance of the cruise control governor in order to obtain maximum fuel economy throughout the entire hill or valley event. The present invention is directed toward meeting these needs.

SUMMARY OF THE INVENTION

The present invention relates to a cruise control governor which is able to dynamically define and switch between various goal droop curves in order to find the best goal droop curve for use with the current vehicle driving situation. For instance, the present invention will dynamically define and select different goal droop curves when the vehicle is lugging up a hill, coasting down a hill, cruising on level ground, preparing to crest a hill, or preparing to transition off of a downhill slope.

In one form of the invention a cruise control governor is disclosed which is operable to maintain a set speed of a vehicle by commanding fueling to an engine of the vehicle according to a plurality of goal droop curves, wherein at least one of the plurality of goal droop curves is dynamically defined during operaton of the vehicle.

DETAILED DESCRIPTION OF THE PREFERRED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention relates to a cruise control governor which is able to dynamically define and switch between various goal droop curves in order to find the best goal droop curve for use with the current vehicle driving situation. For instance, the present invention will dynamically define and select different goal droop curves when the vehicle is lugging up a hill, coasting down a hill, cruising on level ground, preparing to crest a hill, or preparing to transition off of a downhill slope.

Figure 10:
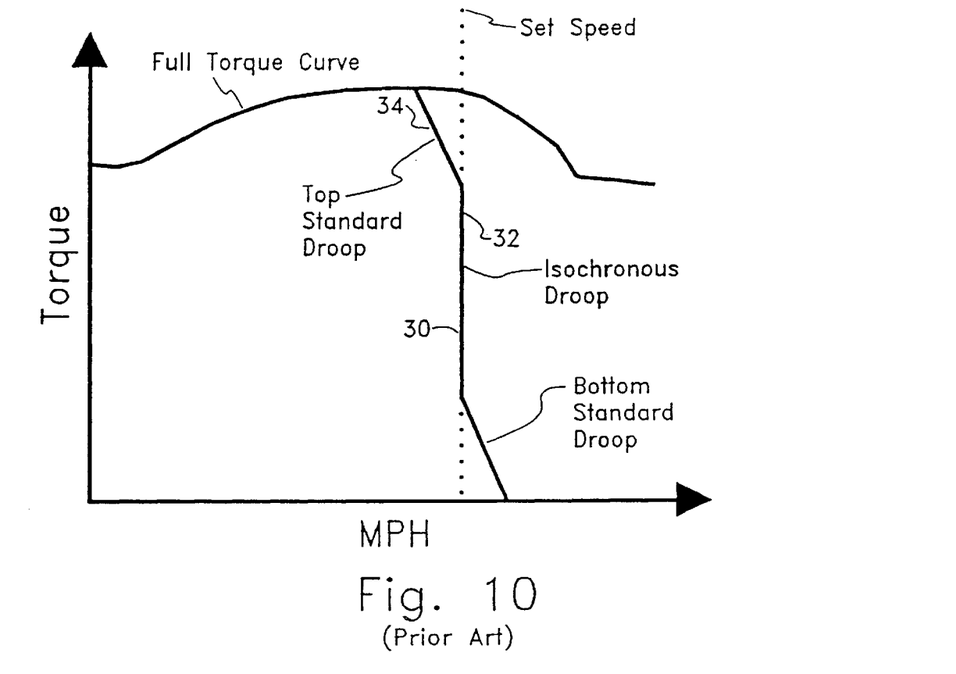
FIG. 10 is a plot of the goal droop curves for a prior art cruise control governor.

Prior art cruise control governors employ a maximum of three goal droop curves as illustrated in FIG. 10. These goal droop curves are referred to as the top standard droop, the isochronous droop and the bottom standard droop. The vehicle cruise control set speed is also indicated in the graph of FIG. 10, this value being set by the driver when cruise control is activated. The cruise control governor attempts to maintain the vehicle's speed at the set speed, however the torque commanded of the engine is determined by trying to maintain vehicle performance on one of the goal droop curves. For example, assume that a vehicle is operating at point 30 on the isochronous droop curve. As the vehicle encounters an uphill slope, the grade of the terrain will cause the vehicle speed to decrease and the cruise control governor will send more fuel to the engine in order to increase the torque output of the engine. Such action by the cruise control governor will move the operating point of the vehicle upwards along the isochronous droop curve to, for example, point 32. At point 32, the vehicle speed is the same as it was at point 30, however more torque is being produced by the engine in order to counteract the decelerating influence of the positive grade. As the grade of the hill continues to increase, more torque will be required of the engine in order to maintain the set speed. In the simplest cruise control governor, only the isochronous droop curve would be present and the governor would attempt to maintain the set speed by increasing the torque output of the engine until the operating point of the vehicle reached the intersection between the set speed and the full torque curve. At this point, the engine is at maximum torque and further deceleration of the vehicle caused by the positive slope grade will cause the operating point of the vehicle to simply move left along the full torque curve. However, many prior art cruise control governor systems recognize that as the engine operating point moves closer to the full torque curve, the fuel efficiency of the engine severely decreases. Therefore, many such systems do not maintain an isochronous droop curve all the way to the full torque curve, but rather insert a top standard droop which transitions between the isochronous droop and the full torque curve. Therefore, as the slope of the hill further slows the vehicle, the operating point of the vehicle will be shifted to move along the top standard droop curve such as to the point 34. The top standard droop curve allows an increasingly lower vehicle speed to be tolerated by the cruise control governor as the operating point of the engine moves nearer to the full torque curve.

When the vehicle reaches the portion of the hill where the percent grade tends to decrease towards the crest of the hill, the speed of the vehicle will automatically increase. The cruise control governor will then adjust the fueling to the engine in order to maintain the operating point of the vehicle on the top standard droop curve, however this point will be moving in a downward direction toward the isochronous droop curve. Conversely, operation of the vehicle will transition to the bottom standard droop curve as the vehicle accelerates past the set speed.

Theoretically, at the crest of the hill the operating point of the vehicle will be on the isochronous droop curve and the set speed will be maintained as a steady state condition. However, in practice the goal droop curves of FIG. 10 produce a significant amount of vehicle speed overshoot beyond the set speed as the operating point of the engine transitions from the top standard droop to the isochronous droop. Furthermore, the droop curves of FIG. 10 do not account for the fact that the vehicle will shortly be entering the downward slope portion of the hill. This means that the acceleration applied toward the crest of the hill will contribute to a vehicle overspeed condition as the vehicle accelerates down the downhill side. All of these problems contribute to rather large deviations from the vehicle set speed and reduced overall fuel economy for the vehicle.

In order to solve these problems, the cruise control governor of the present invention utilizes not only a top standard droop and a bottom standard droop depending upon whether the vehicle is experiencing high torque or low torque, but also a top dynamic droop and a bottom dynamic droop which do not have fixed positions on the torque/mph graph, but rather are defined dynamically in response to current vehicle operating conditions. These are illustrated in FIG. 11.

Operation of the cruise control governor of the present invention according to the goal droop curves of FIG. 11. is as follows. Assume that a vehicle is operating at point 40 on the isochronous droop curve. As the vehicle encounters an uphill slope, the grade of the terrain will cause the vehicle speed to decrease and the cruise control governor will send more fuel to the engine in order to increase the torque output of the engine. Such action by the cruise control governor will move the operating point of the vehicle upwards along the isochronous droop curve to, for example, point 42. At point 42, the vehicle speed is the same as it was at point 40, however more torque is being produced by the engine in order to counteract the decelerating influence of the positive grade. As the slope of the hill further slows the vehicle, the operating point of the vehicle will be shifted to move along the top standard droop curve such as to the point 44. The top standard droop curve allows an increasingly lower vehicle speed to be tolerated by the cruise control governor as the operating point of the engine moves nearer to the full torque curve.

Figure 11:
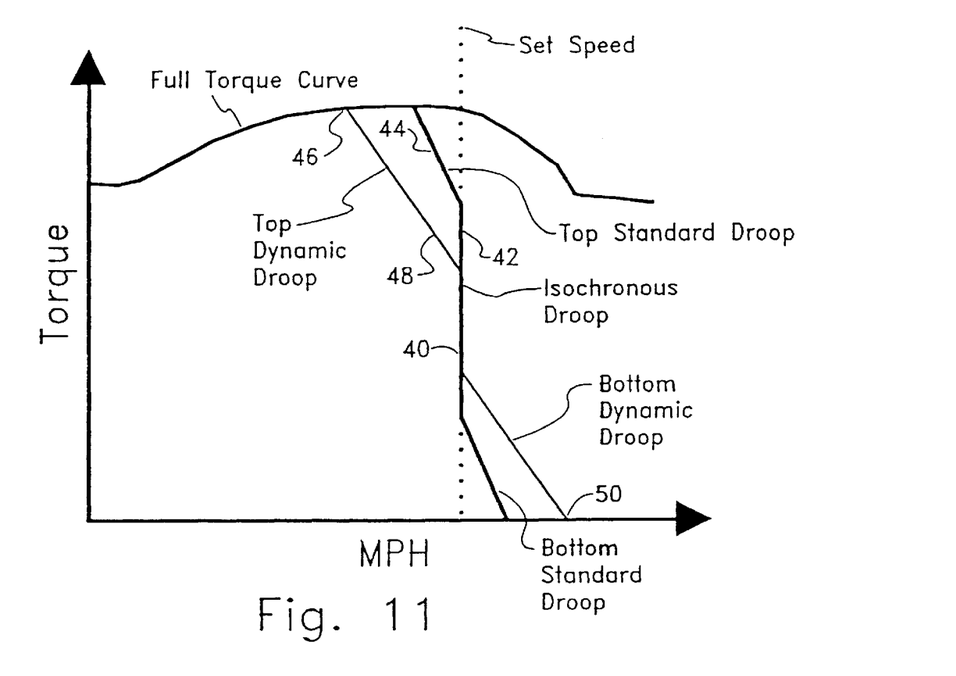
FIG. 11 is a plot of the goal droop curves for a cruise control governor according to the present invention.

Thus far, operation of the cruise control governor of the present invention according to the goal droop curves of FIG. 11 is identical to the prior art cruise control governor using the prior art goal droop curves of FIG. 10. However, once the operating point of the vehicle reaches the full torque curve, continued deceleration of the vehicle on the increasing uphill slope will cause the operating point of the vehicle to move along the full torque curve to the left in FIG. 11. Such leftward movement will continue until the percent grade of the hill ceases to increase and begins to decrease in its transition toward the crest of the hill. At this point, the vehicle will accelerate and the operating point of the vehicle will begin to move to the right on the full torque curve. In the example illustrated in FIG. 11, this corresponds to the point 46. Once this acceleration is sensed by the cruise control governor, the top dynamic droop curve is defined as having an upper end point at the point 46 and a lower end point at a value calculated using a calibratable predetermined slope. As the vehicle travels up the hill, the continuously reducing slope toward the crest of the hill will continue to cause the vehicle to accelerate, forcing the operating point of the vehicle to be moved down the top dynamic droop curve past, for example, the point 48. Once the vehicle reaches the crest of the hill, the operating point of the vehicle will return to the isochronous droop curve.

It will be appreciated by those skilled in the art that the top dynamic droop curve reduces the amount of fueling to the engine much quicker than the top standard droop curve of the prior art cruise control governors. By doing this, the cruise control governor of the present invention reduces overshoot of the set speed once the vehicle reaches the crest of the hill, thereby increasing the fuel economy of the vehicle. Because the top dynamic droop curve is determined dynamically for each hill encountered by the vehicle, it is optimized for the current driving situation and therefore optimizes the possible fuel economy for each different hill scenario. As the vehicle enters the downhill slope of the hill, the operating point of the vehicle moves down the bottom standard droop curve, along the zero torque axis and then back up the bottom dynamic droop curve to the isochronous droop curve as the vehicle comes to the end of the hill. The lowest point 50 of the bottom dynamic droop curve is dynamically defined as the point where the vehicle begins to decelerate at the zero torque condition. It will be further appreciated by those skilled in the art that movement along the goal droop curves of FIG. 11 begins with the bottom droop curves when the vehicle enters a valley and ends with the top droop curves as the vehicle climbs out of the valley.

The cruise control governor of the present invention recognizes that a vehicle will accelerate after cresting a hill. Therefore, to take advantage of this acceleration, fueling should be reduced before the crest of the hill. This will reduce both the possibility of overspeeding and the amount of fuel consumed. Likewise, for a vehicle that has just completed a hill and is heading toward a zero percent grade at the bottom of the hill, fueling should be increased early in order to ensure that the vehicle does not slow to an underspeed condition. The underspeed condition results from the fact that the vehicle decelerates when the momentum added by the downhill grade is removed. The present invention implements these maxims by defining the dynamic droops whenever the vehicle is preparing to crest a hill or preparing to transition off of a downhill condition. The upper dynamic droop is used for cresting a hill and the lower dynamic droop is used for transitioning off of a downhill situation. The upper dynamic droop is based on the fact that when a vehicle prepares to crest a hill, the vehicle will accelerate, thus the cruise control governor uses acceleration to detect the crest of a hill. The bottom dynamic droop is based on the fact that a vehicle transitioning off of a downhill decelerates. Thus, the cruise control governor uses deceleration to detect the end of the hill. Once activated, the upper dynamic droop rolls the fueling off to the engine before the crest of the hill. Similarly, the bottom dynamic droop adds fueling to the engine before exiting the downhill slope of the hill. Even though the top and bottom dynamic droops remove or add fueling before the set speed is reached, the net effect on the vehicle is that the vehicle speed is more consistent.

Figure 12:
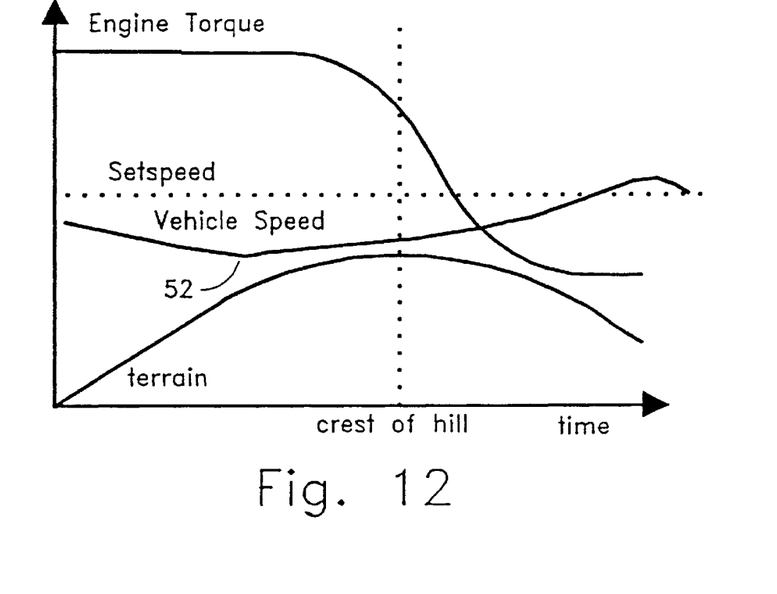
FIG. 12 illustrates engine torque, vehicle speed and terrain altitude vs. time for a vehicle traversing a hill while under the control of a cruise control governor of the present invention.

FIG. 12 schematically illustrates operation of the cruise control governor of the present invention. The vertical axis illustrates engine torque, vehicle speed and altitude concurrently, while the horizontal axis represents time. At time 0, the vehicle is already on the upward slope of the hill and the vehicle speed has decreased from the set speed. This corresponds to a point on the full torque curve of FIG. 11 somewhere to the right of point 46. With the engine at full torque and the grade of the hill continuing increase, the vehicle speed continues to fall away from the set speed as the vehicle moves toward the crest of the hill. However at the point 52, the vehicle speed ceases to decrease and starts to increase. This is caused by a decrease in the percent grade of the hill as the vehicle nears the crest of the hill. The cruise control governor senses this vehicle acceleration and calculates the top dynamic droop curve of FIG. 11, placing operation of the vehicle now at point 46 in FIG. 11. As the speed of the vehicle continues to increase toward the crest of the hill, the cruise control governor rapidly decreases the engine torque by attempting to follow the path of the top dynamic droop curve of FIG. 11. As illustrated in FIG. 12, the vehicle does not reach the set speed at the crest of the hill, however the acceleration boost provided by the downside of the hill smoothly returns the vehicle to the set speed. Without the more rapid decrease in engine torque provided by following the top dynamic droop (i.e. if the cruise control governor had instead followed the top standard droop of the prior art) the vehicle speed would have been returned to the set speed near the crest of the hill and the vehicle speed would have severely overshot the set speed on the downward slope of the hill. Thus, the goal droop curves of FIG. 11 provide a more stable speed for the vehicle throughout the entire hill event, thereby increasing fuel economy.

Since the dynamic droops of FIG. 11 must be maintained until the crest of the hill has passed, and only activated as a response to certain predetermined conditions, the preferred embodiment of the present invention utilizes a state machine to implement the decision logic. A state machine is a device that exhibits two main properties. First, once a state machine decides on an answer, only certain predetermined conditions can change the answer. Second, which of the predetermined conditions needed to change the state machine's answer depends upon what state the machine is currently in. The advantage of utilizing a state machine (as opposed to other logic schemes which could be used to implement the present invention) is that the decisions of the state machine are based upon what the state machine's previous decision was.

Figure 13:
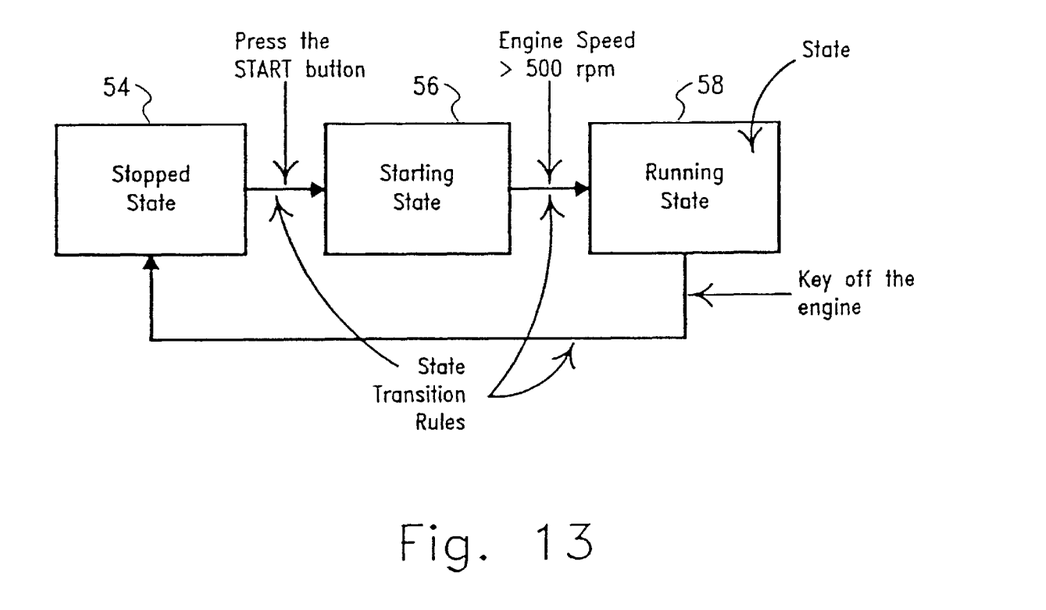
FIG. 13 illustrates a schematic block diagram of an engine control state machine.

FIG. 13 illustrates a simplified example of a state machine which implements an engine control system. The states of a state machine are containers that hold action. While in each state, the action is performed until the transition requirement to the next state has been met. Once the transition requirement has been met, the state machine jumps to the next state and performs the next action until the new transition rule has been met. For example, in the state machine of FIG. 13, the stopped state 54 performs the action of waiting until the engine start button has been depressed. This is the transition rule for the stopped state 54. Once the start button has been depressed, the transition rule for the stopped state 54 has been met and the state machine moves to the starting state 56. The starting state 56 performs the action of starting the engine and waiting for the engine speed to exceed 500 rpm (the transition rule). Once this transition rule has been met, the state machine moves to the running state 58 which performs the action of controlling the engine during normal operation. The transition rule for the running state 58 requires the user to key off the engine, at which time the state machine transfers control back to the stopped state 54.

Figure 14:
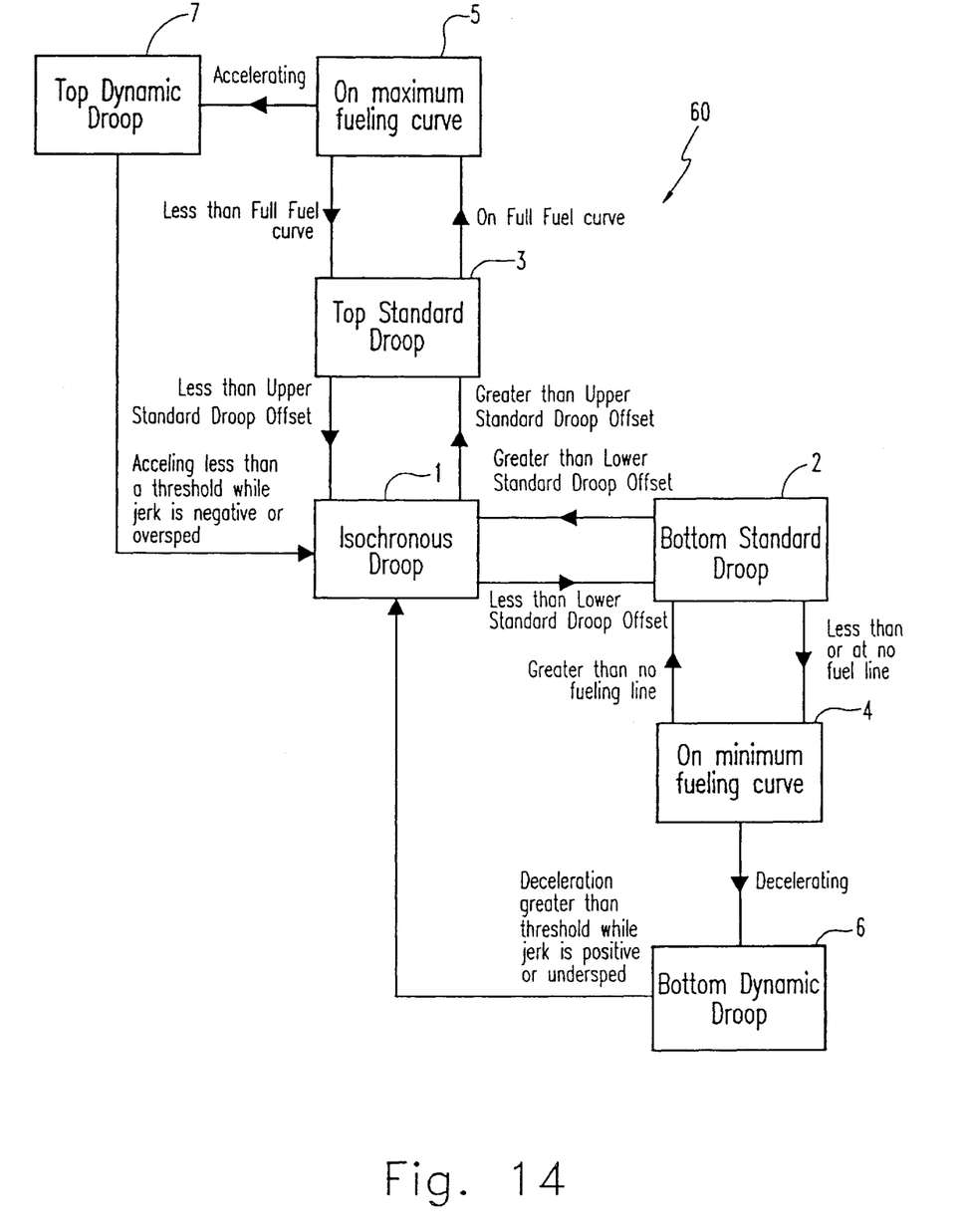
FIG. 14 is a schematic block diagram of a state machine implementing the goal droop curves of the present invention.

Referring now to FIG. 14, a preferred embodiment state machine is illustrated which implements the goal droop curves of FIG. 11. The state machine of FIG. 14 is indicated generally at 60. State 1 of the state machine 60 implements the isochronous droop curve of FIG. 11. State 1 may transition to state 3, which implements the top standard droop curve of FIG. 11, whenever fueling to the engine is determined to be greater than a predetermined amount. This predetermined amount is referred to in FIG. 14 as the upper standard droop offset. Conversely, the state machine 60 can transition between state 3 and state 1 whenever fueling to the engine is less than the upper standard droop offset. State 5 of state machine 60 corresponds to operation of the vehicle on the full torque curve of FIG. 11 (i.e. the maximum fueling curve). The transition rule from state 3 to state 5 simply requires that the engine torque be at a maximum value. Conversely, the transition rule from state 5 to state 3 requires that the engine torque be less than the maximum value. State 7 of state machine 60 implements the top dynamic droop curve of FIG. 11. The transition rule from state 5 to state 7 requires that the vehicle be accelerating. The transition from state 5 to state 7 is indicated as point 46 in FIG. 11. The transition rule from the top dynamic droop curve of state 7 back to the isochronous droop curve of state 1 requires that the vehicle be accelerating less than a predetermined threshold amount while the vehicle jerk (the rate of change of acceleration) is negative or if the vehicle speed is greater than the set speed. It will be appreciated by those skilled in the art that movement on the top dynamic droop curve is unidirectional. In other words, it is not possible to transition from state 7 to state 5 or from state 1 to state 7. The top dynamic droop curve is traversed only from state 5 to state 7 to state 1. The operation of states 2, 4 and 6 of state machine 60, as well as the transition rules therebetween, are directly analogous to the operation of states 3, 5 and 7.

Figure 15:
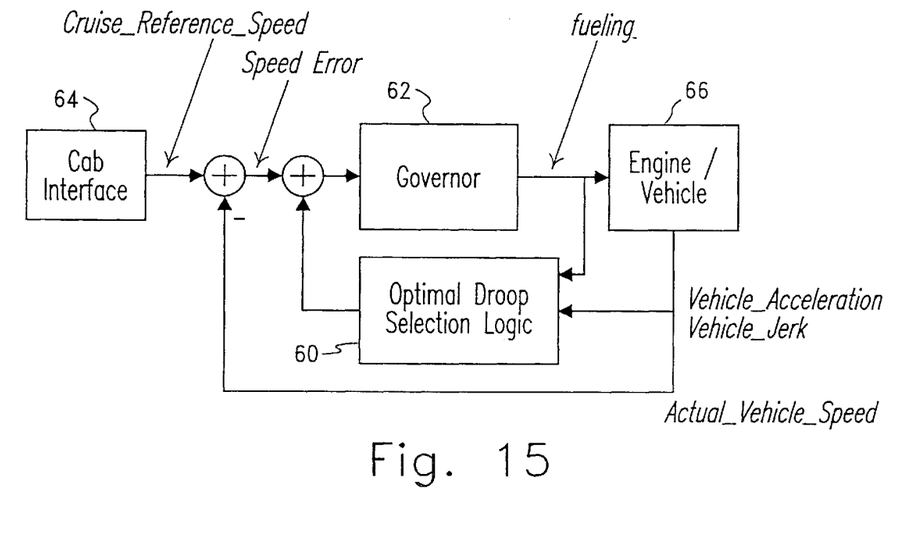
FIG. 15 is a schematic block diagram of the cruise control governor of the present invention.

The integration of the state machine 60 with the cruise control governor 62 is illustrated schematically in FIG. 15. A cruise control cab interface 64 determines the set speed at which the driver wishes to maintain the vehicle. This cruise reference speed is input to the cruise control governor 62 which determines the percent of fueling to command of the engine/vehicle 66. The actual speed of the vehicle 66 is measured and subtracted from the cruise reference speed in order to determine the amount of speed error. This much of the cruise control operation is identical to the prior art devices, as illustrated in FIG. 3. However, the state machine 60 of the present invention provides a correction factor to the speed error before it is transmitted to the cruise control governor 62. The state machine 60 determines this correction factor based upon inputs of the engine fueling level and the vehicle acceleration and vehicle jerk. Using the curves of FIG. 11 and the transition rules illustrated in FIG. 14, the state machine 60 determines the correction factor to be applied to the speed error prior to transmission of the cruise control governor 62.

Figure 16:
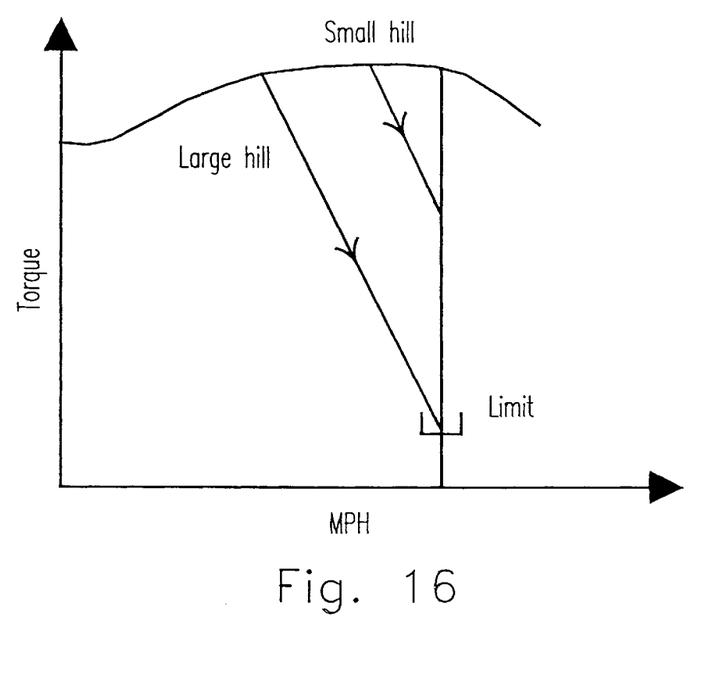
FIG. 16 illustrates two top dynamic droop curves of the present invention.

As illustrated in FIG. 16, when transitioning from state 5 to state 7, the state machine 60 recalculates the location of the top dynamic droop. The top dynamic droop is moved to the exact location on the full torque curve, at which the vehicle began to accelerate. Thus, larger hills will lug back further and result in top dynamic droop curves that are further to the left than those generated by small hills. The reason that the dynamic droops are moved is to better match the terrain and to fully optimize the vehicle operation. Similarly, the location of the bottom dynamic droop is recalculated when the state machine 60 transitions from state 4 to state 6.

As illustrated in FIG. 16, the upper dynamic droop is moved automatically in order to account for the severity of the hill. The reason for moving the dynamic droops is that larger hills have more potential for speed increase as the hill is crested. Thus, to overcome this speed increase, the dynamic droop is more aggressive. Additionally, the top dynamic droop is limited in its operating region to a calibratable lower limit. An analogous movement and upper limit applies to the bottom dynamic droop. Furthermore, the state machine 60 turns off the dynamic droops while the vehicle is resuming to the set speed due to a driver initiated resume event, when the vehicle is not operating in top gear, or immediately following a driver-initiated set event.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A cruise control governor operable to maintain a set speed of a vehicle by commanding fueling to an engine of the vehicle according to a plurality of goal droop curves, wherein at least one of the plurality of goal droop curves is dynamically defined during operation of the vehicle; and wherein the plurality of goal droop curves comprise:
   an isochronous droop curve which coincides with the set speed and is bounded by a first point below a full torque curve of the vehicle and by a second point above a zero torque curve of the vehicle;
   a top standard droop curve which is bounded by the first point and by a third point on the full torque curve;
   a top dynamic droop curve which is dynamically defined during operation of the vehicle and is bounded by a fourth point on the full torque curve to the left of the third point and by a fifth point on the isochronous droop curve between the first and second points;
   a bottom standard droop curve which is bounded by the second point and by a sixth point on the zero torque curve; and
   a bottom dynamic droop curve which is dynamically defined during operation of the vehicle and is bounded by a seventh point on the zero torque curve to the right of the sixth point and by an eighth point on the isochronous droop curve between the second and fifth points.

2. The cruise control governor of claim 1, wherein the at least one dynamically defined goal droop curve has an endpoint coinciding with an operating point of the vehicle on a full torque curve when an acceleration of the vehicle transitions from negative to positive.

3. The cruise control governor of claim 1, wherein the at least one dynamically defined goal droop curve has an endpoint coinciding with an operating point of the vehicle on a zero torque curve when an acceleration of the vehicle transitions from positive to negative.

4. The cruise control governor of claim 1, wherein the fourth point coincides with an operating point of the vehicle on a full torque curve when an acceleration of the vehicle transitions from negative to positive.

5. The cruise control governor of claim 4, wherein the fifth point is determined by an intersection with the isochronous droop curve of a line having a predetermined slope and passing through the fourth point.

6. The cruise control governor of claim 1, wherein the seventh point coincides with an operating point of the vehicle on a zero torque curve when an acceleration of the vehicle transitions from positive to negative.

7. The cruise control governor of claim 6, wherein the eighth point is determined by an intersection with the isochronous droop curve of a line having a predetermined slope and passing through the seventh point.

8. The cruise control governor of claim 1, wherein operation of the governor is transferred from the top dynamic droop curve to the isochronous droop curve if an acceleration of the vehicle is less than a predetermined amount and a rate of change of the acceleration is negative.

9. The cruise control governor of claim 1, wherein operation of the governor is transferred from the bottom dynamic droop curve to the isochronous droop curve if a deceleration of the vehicle is greater than a predetermined amount and a rate of change of the deceleration is negative.

* * * * *